United States Patent [19]

Morrison

[11] 4,043,399
[45] Aug. 23, 1977

[54] TOOTH FOR A ROTO TILLER

[76] Inventor: Burk Guy Morrison, 160A - W. 5th Ave., Sparks, Nev. 89431

[21] Appl. No.: 713,626

[22] Filed: Aug. 11, 1976

[51] Int. Cl.² .............................................. A01B 33/02
[52] U.S. Cl. ...................... 172/42; 172/123; 172/540; 37/141 T
[58] Field of Search ...................... 172/42, 43, 45, 118, 172/123, 121, 540, 556, 543, 753, 548, 713, 553, 713; 301/43, 44 R, 44 B, 52; 37/191 A, 189, 190

[56] References Cited

U.S. PATENT DOCUMENTS

| 302,020 | 7/1884 | Payne | 301/44 R |
|---|---|---|---|
| 1,061,230 | 5/1913 | Evans | 172/121 |
| 1,265,637 | 5/1918 | Fiddler | 301/43 |
| 1,676,646 | 7/1928 | Funk | 172/123 X |
| 2,033,594 | 3/1936 | Stoody | 172/713 |
| 2,636,291 | 4/1953 | Reagle | 172/542 |
| 2,706,441 | 4/1955 | Caldwell | 172/478 |
| 2,708,866 | 5/1955 | Shonts | 172/540 |
| 2,847,924 | 8/1958 | Quick | 172/548 |

FOREIGN PATENT DOCUMENTS 9,752   10/1927   Australia .......................... 301/44 B Primary Examiner—Richard J. Johnson

[57] ABSTRACT

A tooth affixed to the outward end of each tine of a roto tiller, the tooth being made of carbide steel, so as to be very durable, the tooth projecting forwardly at an angle ahead of the tine radius, attachment of the tooth being accomplished either by a metal clamp removably secured to the tine, or else by directly welding the tooth to the tine.

4 Claims, 6 Drawing Figures

TOOTH FOR A ROTO TILLER

This invention relates generally to agricultural machinery. More specifically, it relates to roto tillers.

A principal object of the present invention is to provide a tooth for a roto tiller, the tooth aiding the tiller to loosen the soil much more quickly and readily than heretofore.

Another object of the present invention is to provide a tooth for a roto tiller, which is attached to the roto tiller tine at an angle ahead of the tine radius, so as to pilot the tine and breaking the ground.

Still another object is to provide a tooth for a roto tiller, which can be attached either removably by means of a clamp or else permanently be means of a weld directly to the roto tiller tine.

Other objects are to provide a tooth for a roto tiller, which is simple in design, inexpensive to manufacture, rugged in construction, easy to use and efficient in operation.

These and other objects will be readily evident upon a study of the following specification, and the accompanying drawing, wherein.

Figure 1:
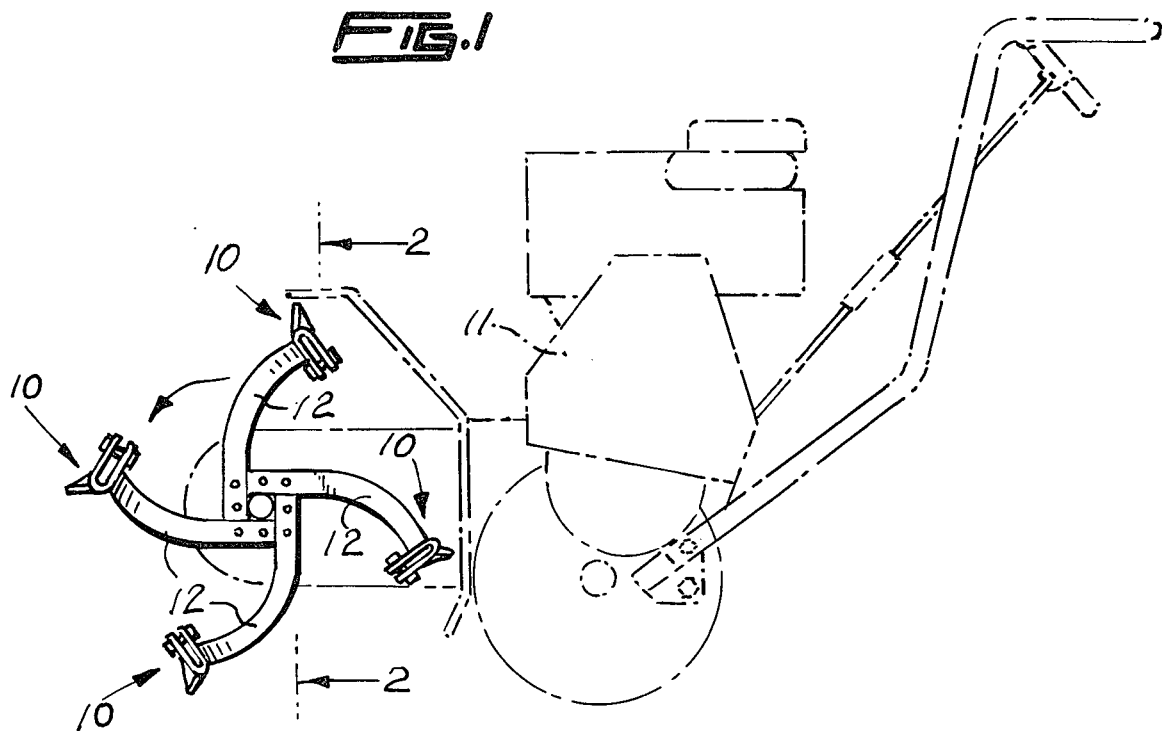
FIG. 1 is a side view of one type of roto tiller, and shown incorporating the present invention installed on the tines thereof.
Figure 2:
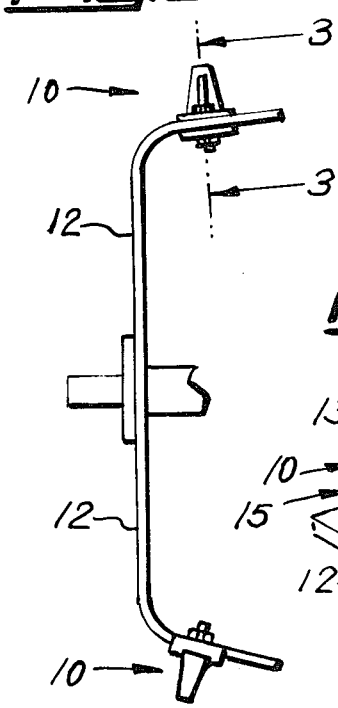
FIG. 2 is a view taken in direction 2—2 of FIG. 1.

Referring now to the drawing in greater detail, and more particularly to FIGS. 1 through 4 thereof at this time, the reference numeral 10 represents a tooth for a roto tiller 11, according to the present invention, wherein each tooth 10 is secured to the end of each of the roto tiller tines 12.

Each tooth is comprised of a carbide steel tip member 13, which on its rear side is welded to a metal angle 14, the metal angle being welded to a metal clamp 15 of U-shaped configuration, so as to clip around the tine 12, the ends of each leg 16 of the metal clamp each having an opening 17 therethrough, so as to receive a clamping bolt 18, fitted with a removable nut 19. Thus, the tooth is removable attachable to the end of the tine.

Figure 3:
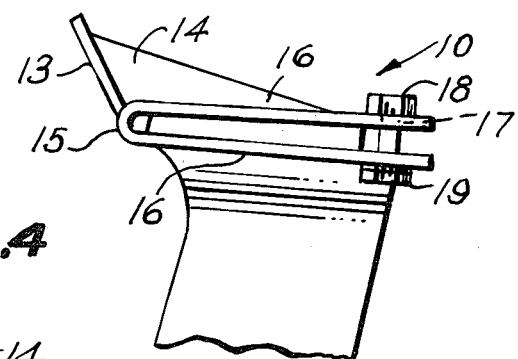
FIG. 3 is an enlarged view taken on line 3—3 of FIG. 2.
Figure 4:
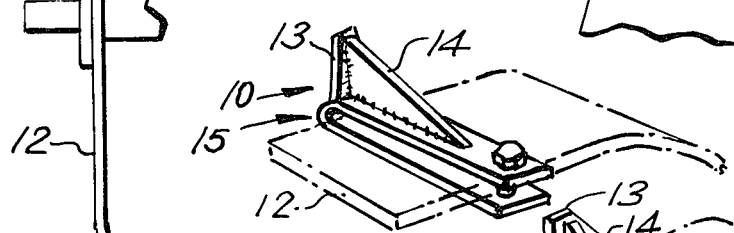
FIG. 4 is a perspective view of the invention, shown per se.

It should be noted that the carbide tip is tilted angularly, so as to be ahead of the tine radius, as is clearly shown in FIGS. 1 and 3. the tip is secured to one of the legs adjacent the base of the U-shaped clamp and is positioned at an obtuse angle with respect to said one leg. In this position, the tip initally engages the soil before the tine.

Figure 6:
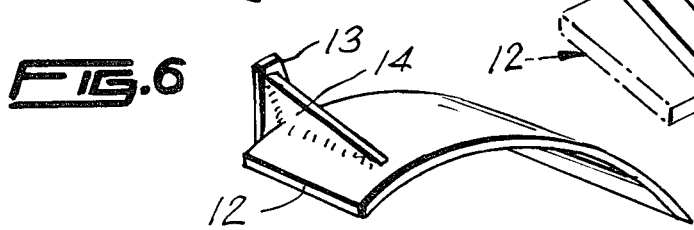
FIG. 6 is a perspective view of still another modified design, in which the tooth is welded directly to the roto tiller tine.

As shown in FIG. 6, the tooth can alternately be made so that it is permanently secured to the tine, instead of being removable therefrom, such as is suggested by the clamp described above. In the form of The invention illustrated in FIG. 6, the tooth 20, accordingly, is comprised of the carbide steel tip 13, with the metal angle 14 to a rear side of the carbide tip, and the metal angle is then welded directly to the tine 12. Thus, the metal clamp is completely eliminated in this design.

Figure 5:
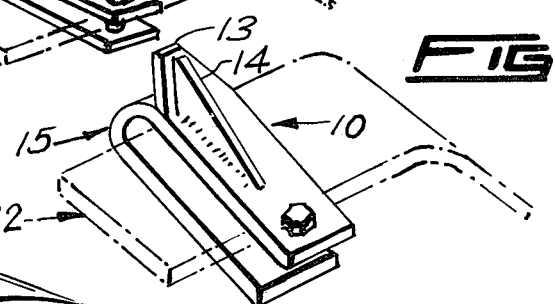
FIG. 5 is a perspective view thereof, and showing a modified design, in which the metal angle is bowed at the bottom, to match the bow of the top leg of the clamp 15, to help keep the tooth from sliding off the tine.

Reference is now made to FIG. 5 of the drawing, wherein there is still another modified design of rototiller tooth 30, and which is the same as the above described tooth 10, except that in this design, straight at the point of being welded to the top of the clamp 15, now has a slight bow at the bottom. The top of clamp 15 is bowed to match. Thus when bolted to tine 12, will bind down on the mid-top of tine 12, and an upward bind at the front of tine 12, thus, making the clamp 15 more able to stay on the tine 12. The hole in clamp 15 is drilled one half the bolt diameter, closer to the front of tine 12. Therefore, it would be necessary to make a notch in the rear of tine 12, (one half the bolt diameter.)

Thus different designs of the invention are provided.

While various other changes may be made in the detail construction, it is understood that such changes will be within the spirit and scope of the present invention, as is defined by the appended claims.

What I claim is:

1. In combination with a roto tiller having a plurality of radially extending tines mounted to rotate about a generally horizontal axis and wherein each tine terminates in a generally axially extending earth working blade having a cutting edge thereon, the improvement comprising: A digging tooth assembly having a generally U-shaped mounting portion telescoped over at least one of said tines and including a leading portion positioned slightly forwardly of the cutting edge on said blade, a digging tooth having one end secured to said leading portion and having a surface projecting outwardly at an angle inclined forwardly to a radius from said axis, an angle support member between said tooth and said mounting portion, and means securing said tooth assembly to said tine.

2. The combination of claim 1 wherein a notch is provided in the edge of one of said tines and a fastening member extends through said U-shaped mounting portion and at least a portion of said notch.

3. A tooth for a roto tiller comprising, a generally U-shaped clamp adapted to be fitted over a cutting blade on said roto tiller, said clamp having a pair of generally parallel legs with the terminal ends of said legs having an opening therethrough to receive a fastening member to clamp said legs against a blade, a carbide steel tip secured to one of said legs adjacent the base of said clamp and projecting generally at an obtuse angle with respect to said one leg, said tip including means secured to said leg for reinforcing said tip.

4. The tooth of claim 3 wherein at least one of said legs is bowed along the length thereof to bind against a rototiller blade. Reagle has been cited because of the digging teeth.

* * * * *